March 11, 1952   D. F. WINTER   2,588,599
ROTARY RAKE AND STUBBLE CLEANER
Filed Dec. 28, 1949   2 SHEETS—SHEET 1
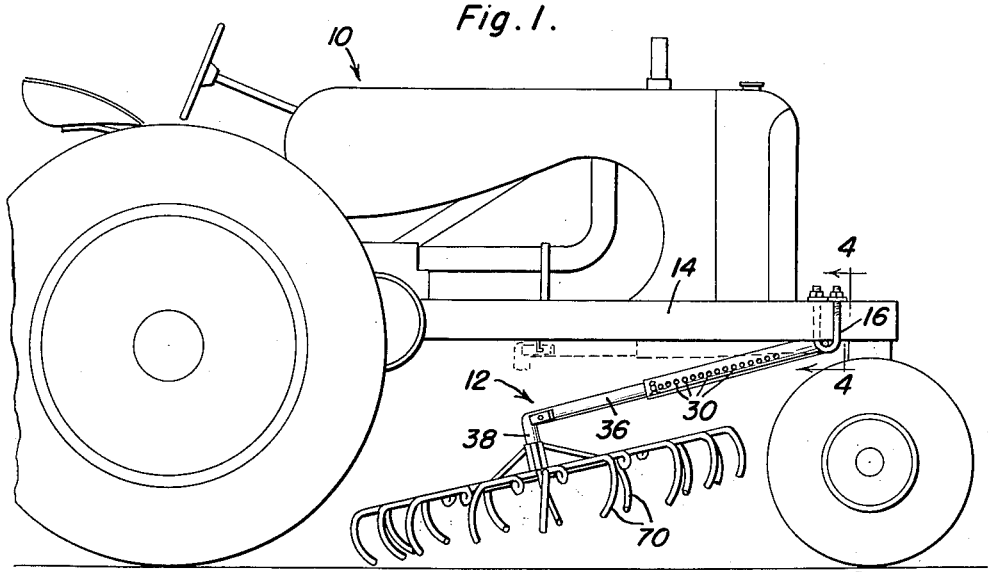
Fig. 1.
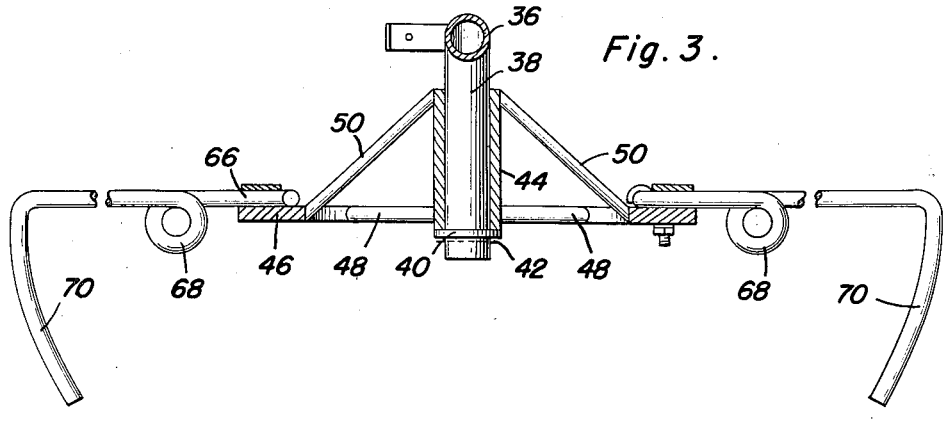
Fig. 3.
Fig. 6.
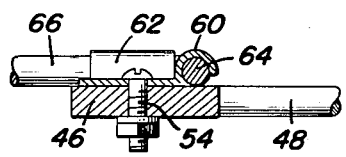
Daniel F. Winter
INVENTOR.
BY Clarence A. O'Brien
and Harvey B. Jacobson
Attorneys March 11, 1952     D. F. WINTER     2,588,599
ROTARY RAKE AND STUBBLE CLEANER
Filed Dec. 28, 1949     2 SHEETS—SHEET 2
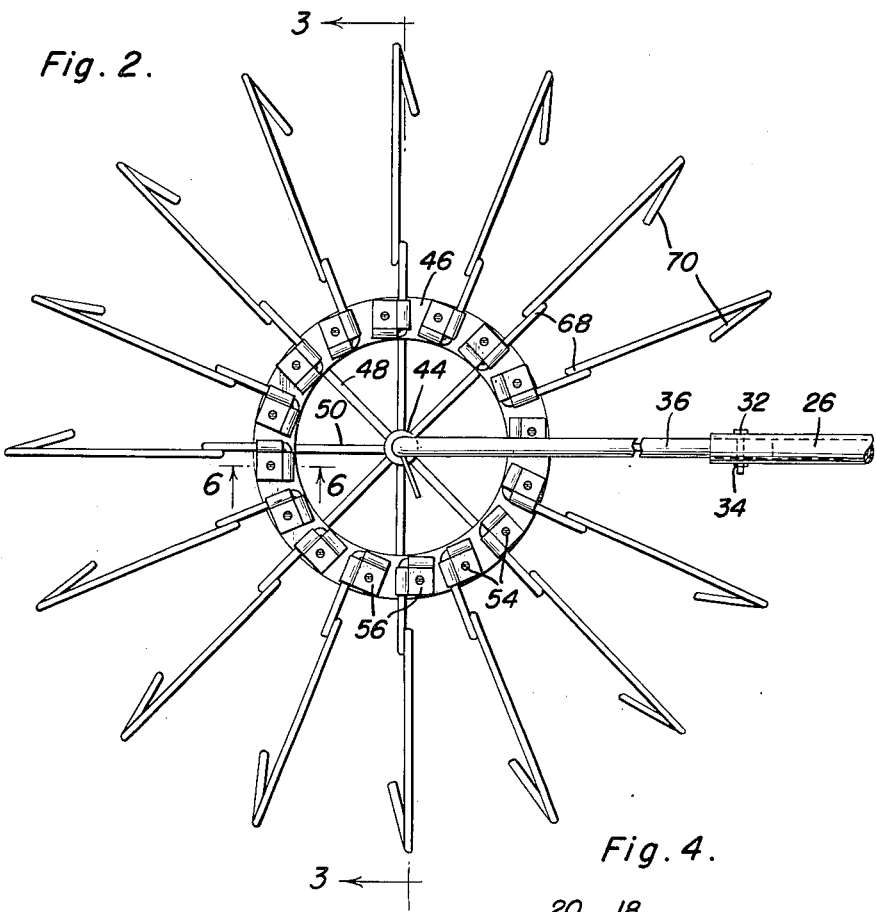
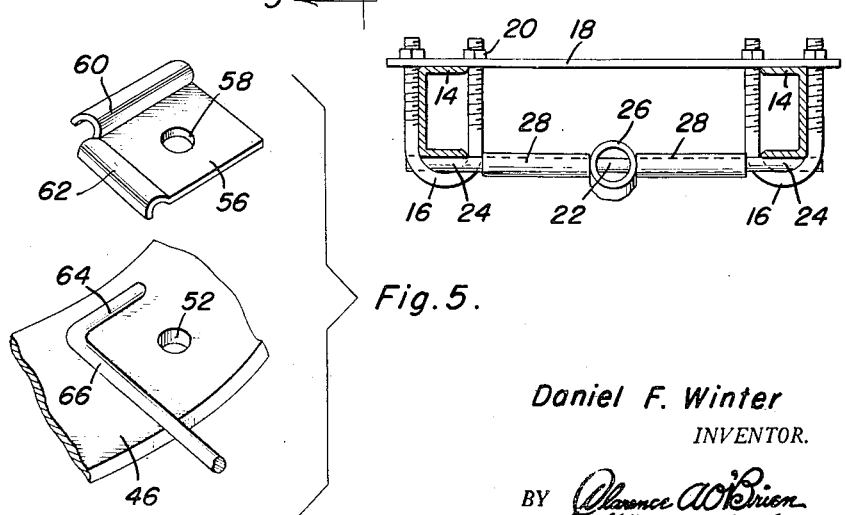
Daniel F. Winter
INVENTOR.

Patented Mar. 11, 1952

2,588,599

UNITED STATES PATENT OFFICE 2,588,599

ROTARY RAKE AND STUBBLE CLEANER

Daniel F. Winter, Ceylon, Minn.

Application December 28, 1949, Serial No. 135,440

5 Claims. (Cl. 56—377)

This invention comprises novel and useful improvements in a stubble cleaner and more specifically pertains to a rotary rake attachment adapted for use in conjunction with a tractor or plow for clearing a path through stubble or straw left by a combine in the path of travel of a plow or other farm implement in the furrow or course made the previous round of the implement.

The objects of this invention are to provide an improved rotary rake particularly adapted to the specific task of clearing stubble or straw from the path of a plow; to provide an improved rotary rake construction and means for mounting the same; to effect a ready replacement and easy servicing of parts of the rotary rake; and to facilitate and simplify the adjusting of the position of the rotary rake with respect to the framework for supporting the same and with respect to a plow or other implement with which is to be used.

These, together with various ancillary features and objects of the invention, which will later become apparent as the following description proceeds, are attained by the present invention, a preferred embodiment of which has been illustrated by way of example only in the accompanying drawings, wherein:

Figure 1 is a fragmentary side elevational view showing a conventional form of farm tractor adapted for drawing or handling a plow or similar agricultural implement, and showing the improved rotary rake forming the subject of this invention mounted thereon;

Figure 2 is a top plan view upon an enlarged scale of the improved rotary rake itself;

Figure 3 is a vertical central sectional view upon an enlarged scale through the rake taken substantially upon the plane indicated by the section line 3—3 of Figure 2;

Figure 4 is a vertical transverse sectional view upon an enlarged scale taken substantially upon the plane indicated by the section line 4—4 of Figure 1 and showing the mounting means upon which the device is attached to the frame of a tractor;

Figure 5 is a fragmentary exploded perspective view upon an enlarged scale showing the elements and the manner about which the teeth of the rake are attached to the hub portion of the same;

Figure 6 is a fragmentary sectional view upon an enlarged scale taken substantially upon the plane indicated by the section line 6—6 of Figure 2.

Referring now first to Figure 1 it will be seen that there is disclosed at 10 a conventional form of farm tractor such as is employed to pull a plow or other agricultural implement, not shown. Removably and adjustably secured to this tractor, is the improved stubble cleaner indicated generally by the numeral 12, which is adapted to be removably and adjustably clamped upon the angle or channel iron frame members 14 forming a part of the tractor chassis.

The stubble cleaner is adjustably and removably secured to the framework of the tractor in a manner and by the structure indicated more specifically in Figure 4. As shown therein, a pair of U-bolts 16 straddle each of the frame members 14 in an inverted position, and engage a transversely disposed clamping bar 18, being secured thereto as by fastening nuts 20. Between the loop portions of the U-bolts and the bottom surfaces of the frame members 14, there is clamped a transversely disposed bar or shaft 22 by its terminal portions 24. Freely journaled on the transverse shaft 24, as by means of transversely disposed apertures, is the forward extremity of the tubular member 26. This member is held against lateral displacement upon the bar 22 which constitutes an axle, by means of spacing sleeves or the like 28 which are disposed between the member 26 and the U-bolts 16 as shown in Figure 4. It will now be seen that the clamping assembly may be adjustable longitudinally of the frame members 14 of the tractor as desired, and thus center the forward end of the tubular member 26 with respect thereto, while permitting free vertical pivoting movement.

A plurality of longitudinally spaced apertures 30 is provided in the tubular member 26, as shown in Figure 1. These apertures, as shown in Figure 2, are adapted to selectively receive a transverse fastening pin 32 which is adjustably retained in a desired set of apertures as by a cotter pin or the like 34. This fastening pin 32 serves to longitudinally and extensibly secure the forward, apertured extremity of a shaft 36 which may be in the form of a tube or bar as desired. The shaft 36 at its rearward end, is provided with a perpendicularly disposed crank portion 38. The members 26 and 36 constitute an adjustable draft bar by means of which the rotary rake whose construction is to be now described, is adjustably secured to the tractor, is freely pivoted relative thereto, and is adjustably positioned with respect to a plow or other implement drawn by the tractor.

The lower extremity of the crank arm 38 is provided with a retaining washer 40 detachably secured thereon as by a cotter pin or similar fastener 42, extending through a diametrical aperture in the end of the crank arm 38.

The rotary rake includes a hub 44 in the form of a sleeve or tubular member which is rotatably but removably journaled upon the crank arm 38 being retained thereon by the washer 40 above mentioned. To the hub 44 is rigidly attached an annular rim 46 by means of radially disposed spokes 48 which are secured to the sleeve 44 adjacent one end thereof, and by means of other spokes 50 attaching the rim to the other extremity of the sleeve. Thus there is provided a rigid wheel assembly which is rotatably journaled upon the crank arm 38. A plurality of resilient teeth are detachably secured to the rim 46 in a manner which will permit independently removal of the individual teeth for servicing or replacement of the same. For this purpose, the rim 46 is provided with a plurality of circumferentially spaced apertures 52, see Figure 5, adapted to receive fastening nuts and bolts indicated at 54. A fastening clip consisting of a flat plate 56 apertured as at 58 for the reception of the fastening bolt 54, is provided for each of the apertures 52 and is secured to the rim 46 by the aforesaid fastening bolt. Upon two of its adjacent edges, the plate 56 is provided with semi-cylindrical channeled portions 60 and 62, disposed at a suitable angle with respect to each other and adapted to selectively receive the angulated end portions 64 and 66 of a rake tooth. Thus, the channel portions 60 and 62 will overlie the portions 64 and 66 and firmly clamp the same to the rim 46 as shown in Figures 5 and 6.

Each of the rake teeth preferably includes a spiral portion 68 for imparting resiliency to the rake tooth, and terminate in hooks 70, which as shown in Figure 2, are disposed at a slight angle such as about 15 degrees to the longitudinal axis of the rake tooth. These hooks are disposed at an angle of 15 degrees in retarded relation to the direction of rotation of the rotary rake.

It will be seen by particular reference to Figure 1 that the plane of the rim 46 and rake teeth carried thereby, is inclined with respect to the surface of the ground over which the device travels, so that a relatively few of the rake teeth will contact the surface of the ground at one time. In view of the inclination of the teeth, this contact will cause a side thrust upon the rake which will tend to rotate the same, and this rotating action of the rake will cause the revolving teeth to sweep and rake stubble coming in front of the path of travel of a plow carried behind the tractor 10.

From the foregoing, the construction and operation of the device together with its many advantages will be readily understood and further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and improvements may be resorted to, falling within the scope of the appended claims.

Having described the invention, what is claimed as new is:

1. A stubble cleaner attachment for plows comprising a member having a crank arm, a rotary rake comprising a hub journaled on said arm, a flat rim, spokes securing said hub to said rim, spring teeth extending radially from said rim, means detachably securing said teeth to said rim and means for supporting and mounting said member and crank arm in predetermined position with respect to the ground whereby the rake will revolve in a plane inclined with respect to the ground and about an axis which is inclined with respect to the vertical.

2. The combination of claim 1, wherein said teeth have angularly disposed mounting portions, a clamping plate for each tooth having angularly disposed channels receiving said angularly disposed mounting portions, means securing said plate to said rim.

3. The combination of claim 1, wherein each tooth has a raking end depending perpendicularly therefrom, said end being inclined with respect to the radial plane through said tooth which is perpendicular to the axis of rotation.

4. The combination of claim 1, wherein said mounting means includes a tube slidably receiving said member, means for securing said member in longitudinally adjusted position in said tube, an axle secured to and extending transversely of said tube and supporting the same, brackets secured to said axle for clamping the ends of said axle to a support.

5. The combination of claim 1, wherein said mounting means includes a tube slidably receiving said member, means for securing said member in longitudinally adjusted position in said tube, an axle secured to and extending transversely of said tube and supporting the same, brackets secured to said axle for clamping the ends of said axle to a support, spacer sleeves on said axle between said tube and said brackets.

DANIEL F. WINTER.

REFERENCES CITED

The following references are of record in the file of this patent:

UNITED STATES PATENTS

| Number | Name | Date |
|---|---|---|
| 333,917 | Brown | Jan. 5, 1886 |
| 1,244,982 | Horst | Oct. 30, 1917 |
| 1,978,717 | Oppenheim | Oct. 30, 1934 |

FOREIGN PATENTS

| Number | Country | Date |
|---|---|---|
| 16,403 | Great Britain | July 17, 1911 |